Figure 1:
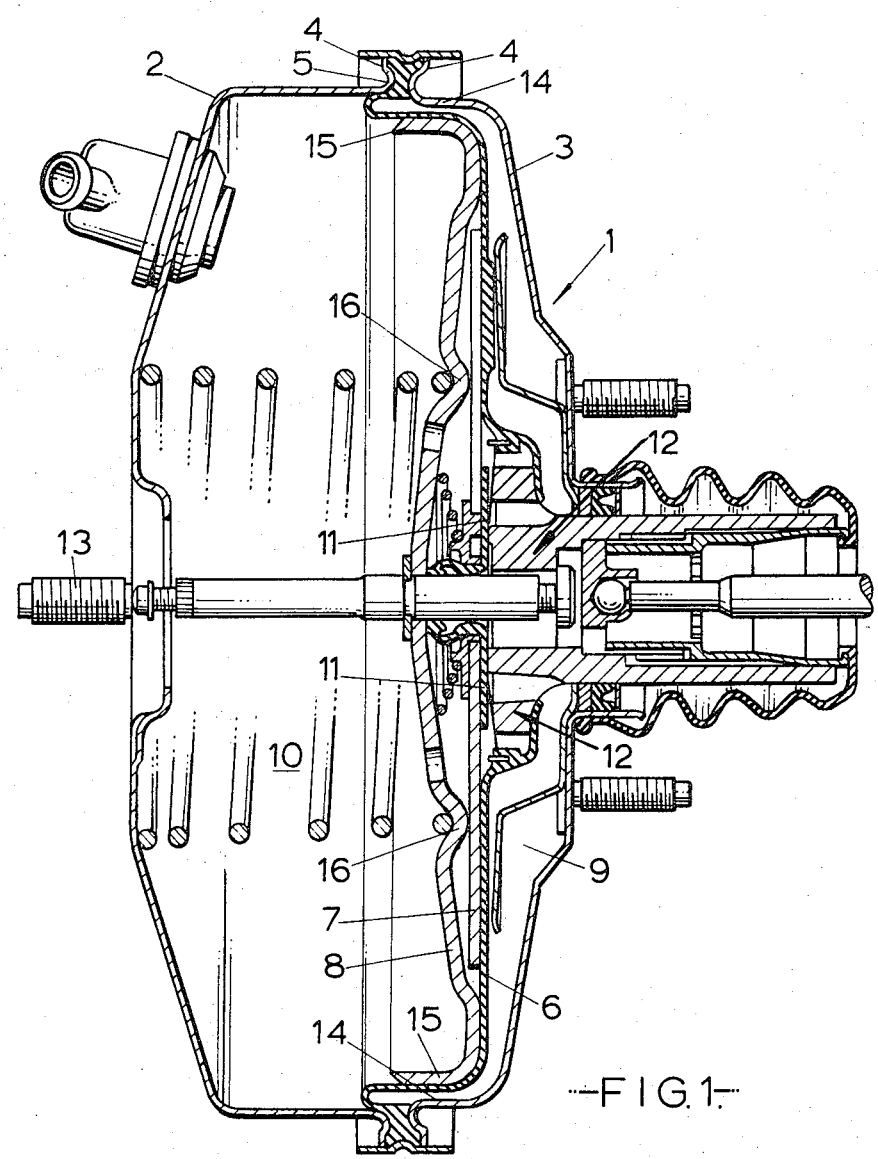

United States Patent [19]
Weatherhogg

[11] 3,807,279
[45] Apr. 30, 1974

[54] SERVO MOTORS

[75] Inventor: Charles Brian Weatherhogg, Birmingham, England

[73] Assignee: Girling Limited, Birmingham, England

[22] Filed: Oct. 29, 1971

[21] Appl. No.: 193,629

[30] Foreign Application Priority Data
Nov. 12, 1970 Great Britain .................. 53804/70

[52] U.S. Cl. ............................... 91/369 B, 92/99
[51] Int. Cl. ........................................... F15b 9/10
[58] Field of Search .......... 91/369 A, 369 B, 369 R, 91/376; 92/99, 98 R, 98 D, 100

[56] References Cited
UNITED STATES PATENTS
| | | | |
|---|---|---|---|
| 2,828,719 | 4/1958 | Ayers, Jr. | 91/369 B |
| 3,316,816 | 5/1967 | Yardley | 91/369 B |
| 3,463,054 | 8/1969 | Farr | 91/369 B |

FOREIGN PATENTS OR APPLICATIONS
1,144,567  3/1969  Great Britain .................. 91/369 B

*Primary Examiner*—Paul E. Maslousky
*Attorney, Agent, or Firm*—Scrivener Parker Scrivener and Clarke

[57] ABSTRACT

The present specification describes and claims a servo-motor for vehicle brakes. The servo-motor has two contiguous fluid-tight compartments separated by a movable wall which is formed by a flexible diaphragm, a deflector plate and a fulcrum plate. The deflector plate comprising radially outwardly extending circumferentially spaced fingers, acts with the fulcrum plate to control a valve assembly for governing the fluid flow into and out of one of the compartments, the fulcrum plate being connected to an output rod of the servo and extending to beyond the perimeter of the deflector plate to afford support for the diaphragm when under pressure.

14 Claims, 2 Drawing Figures

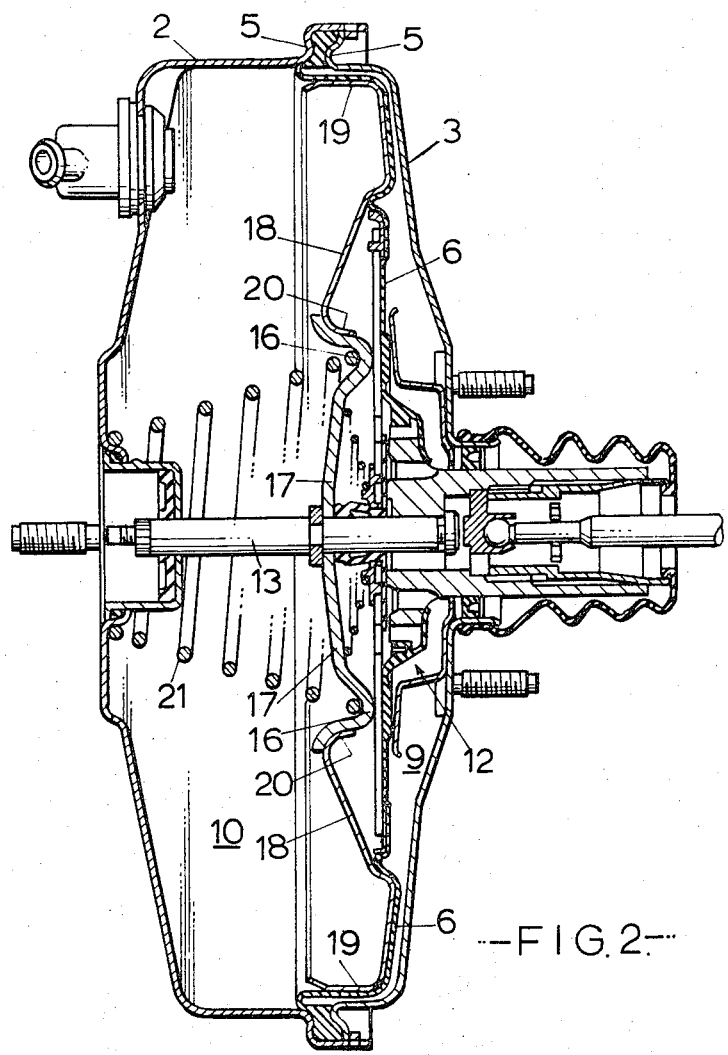

SERVO MOTORS

The present invention relates to servo motors for vehicle brake systems and particularly relates to servo motors of the type having two contigeous fluid-tight compartments separated by a movable wall.

A known servo motor of this type is that disclosed in our British Patent Specification No. 1,144,567. In that patent specification spaced fingers control a pair of concentric valves and pivot alternately about one or other valve according to whether air is being admitted into the unit to actuate the booster to apply the brakes or air is being withdrawn from the unit to relieve the brakes. Because the valves are concentric, the pivot arm is shorter when the lever pivots about the outer valve to open the atmosphere connection than when it pivots about the inner valve to open the vacuum connection.

In order to gain higher boost ratios and output loads it is known to use a "tandem booster". However, in some installations there is not sufficient axial length for a tandem servo and hence the required results are achieved by increasing the diameter of the servo.

The opening of the valves in these servos, results from the tilting of the fingers about a fulcrum on the fulcrum plate when the mechanical actuating rod is moved axially. A problem with this construction is that when a large diameter servo is produced the fingers have to be increased in length to provide support for the diaphragm. This results in the effective centre of pressure of the air on the delfector plate being moved radially outwards and requires the fulcrum for the fingers (i.e. the beaded edge of the fulcrum plate) located within the centre of pressure annulus to maintain the so-called "feel" of the brakes to also be moved radially outwards.

The increased length of the fingers and the relocation of the fulcrum results due to the alteration of the lever ratios involved, in undesirable excess valve travel.

The present invention overcomes these constructional problems and allows identical fingers to be used in both small and large servos, the fulcrum being similarly located in all constructions, thus preventing the undesirable excess valve travel.

According to the present invention there is provided a servo motor or booster of the type hereinbefore described comprising, a housing which is internally divided into two chambers by a movable wall formed by a diaphragm, a deflector plate and a fulcrum plate; the deflector plate being interposed between the diaphragm and the fulcrum plate, said fulcrum plate extending radially outwardly to beyond the deflector plate, thereby providing some support for said diaphragm.

The outer edge of the fulcrum plate may be provided with an annular skirt which extends substantially parallel to the side walls of the housing, or have a beaded edge. The beaded edge will reduce the possibility of the fulcrum plate edge damaging the diaphragm, whilst the annular skirt will also prevent the diaphragm from sagging along the adjacent axial portion and so prevent the diaphragm from twisting and fracturing.

According to a further feature of the present invention there is provided a servo-motor or booster of the type hereinbefore described comprising, a housing which is internally divided into two chambers by a movable wall formed by a diaphragm, deflector plate and fulcrum plate, the deflector plate being interposed between the diaphragm and the fulcrum plate, and the fulcrum plate which terminates adjacent to the side walls of the housing, being provided at its outer edge with an annular skirt extending substantially parallel to said side walls.

The extension of the fulcrum plate and the provision of the annular skirt for supporting the flexible diaphragm will enable the same fingers to be used in both large and small servo units and the fulcrum which is an annular bead formed on the fulcrum plate, to be maintained on a smaller diameter, thus retaining the same lever ratios for all units and overcoming the problem of excess valve travel. Hence the radial distance of the fulcrum point from the centre of the fulcrum plate and the size of the fingers of the deflector plate, may be the same for all sizes of servo unit, the only differences being in the diameter of the fulcrum plate and the diaphragm and the outer shells.

The fulcrum plate may be of one-piece construction or alternatively a fulcrum plate normally used in small servos may be modified for use in larger servos by attaching the inner edge of an annular extension plate to the outer edge of the fulcrum plate, the outer edge of the annular extension plate being provided with said skirt.

The present invention will now be further described by way of example, with reference to the accompanying drawings, in which:

FIG. 1 is a section through one embodiment of a mechanical servo constructed in accordance with the present invention, and FIG. 2 is a section through a second embodiment of a mechanical servo constructed in accordance with the present invention.

In the servos shown in the drawings, a housing generally designated by the reference numeral 1 is made up of two, cylindrical cupped parts 2 and 3 which are peripherally formed with radially outwardly directed flanges 4 including opposed bead portions 5 between which is clamped the outer peripheral edge of a cylindrical elastic diaphragm 6. The diaphragm 6 together with a deflector plate 7 and fulcrum plate 8, forms a movable wall which divides the interior of the housing into two fluid chambers 9 and 10. The deflector plate 7 is formed from a plurality of radially extending circumferentially spaced fingers which are arranged to act with the fulcrum plate 8 to move a valve closure member 11 which opens or closes either of the valve openings in the valve assembly generally designated 12. The detailed operation of this valve assembly 12 described in our British Patent Specification No. 1,144,567. The fulcrum plate 8 which is fixed to the output rod 13 of the servo, is dished and extends virtually to the side walls 14 of the servo housing, an annular skirt 15 integral with the fulcrum plate extending from its outer edge parallel to said side walls 14. The fulcrum plate also has an annular bead 16 which acts as a fulcrum about which the fingers of the deflector plate 7 can pivot to operate the valve assembly 12.

Known types of servo can be modified in accordance with the present invention as seen in FIG. 2. This enables identical fingers to be used in any size servo. In such cases the fulcrum plate is formed in two parts, a central part 17 which can be an existing fulcrum plate for a smaller servo, and an annular extension plate 18, the inner edge 20 of the extension plate being attached to the outer edge of the central part 17 (FIG. 2), the extension having a skirt 19 along its outer edge. As seen from FIG. 2, the annular extension 18 can be formed from a thinner gauge metal than the central part 17 thus providing for a lighter assembly than if the central part 17 and extension are of one-piece construction of constant gauge metal as in the embodiment illustrated in FIG. 1, the central part 17 having to be of a sufficient thickness to have sufficient rigidity to convey the force of spring 21 when compressed, to the actuator rod 13.

In both of the above described embodiments the diaphragm 6 is thus supported in the region of the side walls of the housing by the fulcrum plate 8 (FIG. 1) or an extension 18 of the fulcrum plate 17, (FIG. 2) in contrast to previous servos where the fingers of the deflecting plate 7 have provided such support in conjunction with a plastic skirt.

In previous servos of this type, when large diameter servos were required, the fingers of the deflecting plate were merely extended to provide the necessary support for the diaphragm. Thus, in comparison to smaller servo units the centre of pressure of the diaphragm, on which air effectively acted when the unit was operated, was moved radially outwards. To maintain the so-called feel of the brakes the fulcrum is required to be within the annulus created by the centre of pressure, for the reasons described in our British Patent Specification No. 1,144,567. Also, to maintain the correct boost ratio the fulcrum point must be moved radially outwards towards the centre of pressure annulus. The boost ratio of any servo motor being defined as the ratio of output force to input force. The size of boost ratio is determined by the position of the fulcrum pivot relative to the centre of pressure.

Hence, in the larger diameter servos as previously constructed the distance between the fulcrum and the respective vacuum and air valve seats had to be increased resulting, as can be seen on consideration of simple lever ratios, in an increase in the axial movement of the valve closure member far in excess of a desirable amount.

The present invention overcomes this constructional problem, allowing identical fingers and the same location of fulcrum to be used in both large and small servo units. The extended fulcrum plate with its annular skirt provides support for the diaphragm over the area beyond the fingers and acts to transmit the forces acting over this area to the output rod.

Thus, the same amount of axial movement of the valve closure member for all sizes of servo is maintained and only the fulcrum plate need be modified according to the diameter of a particular servo.

I claim:

1. A servo motor for vehicle brakes comprising a housing, a movable wall dividing the housing into two fluid-tight compartments, a valve assembly for controlling fluid flow to and from one of said compartments, a diaphragm, a deflector plate and a fulcrum plate forming said movable wall, radially extending circumferentially spaced fingers forming the deflector plate which is situated between the diagram and the fulcrum plate, an intergal annular bead provided on the fulcrum plate, acting as a fulcrum about which the said fingers can pivot to control the valve assembly, the fulcrum plate extending radially outwardly to beyond the deflector plate to provide support for the diaphragm beyond the said fingers of the deflector plate, when under pressure and to enable a one-sized deflector plate to be usable in various diameter servos.

2. A servo motor according to claim 1, wherein an annular skirt integral with the outer edge of the fulcrum plate, extends substantially parallel to the side walls of the housing.

3. A servo motor according to claim 2, wherein the fulcrum plate is of two part construction, one part forming a central portion and the other part in the form of an annular section, forming an extension of the fulcrum plate, the annular section being provided with said skirt along its outer edge and joined at its inner edge to the outer edge of said central portion.

4. A servo motor according to claim 3, wherein the annular section is made of thinner gauge metal than the central portion.

5. A servo motor according to claim 4, wherein the outer region of the central portion has said annular bead about which the deflector plate can pivot.

6. A servo motor according to claim 1, wherein two cylindrical cupped parts form said housing, radially outwardly directed flanges being provided on each cupped part and the outer peripheral edge of the diaphragm being clamped between said flanges.

7. A servo motor according to claim 6, wherein the diaphragm is cylindrical.

8. A servo motor for vehicle brakes comprising a housing, a movable wall dividing the housing into two fluid-tight compartments, a valve assembly for controlling fluid flow to and from one of said compartments, a diaphragm, a deflector plate and a fulcrum plate forming said movable wall, radially extending circumferentially spaced fingers forming the deflector plate which is situated between the diaphragm and the fulcrum plate, an integral annular bead provided on the fulcrum plate, acting as a fulcrum about which the said fingers can pivot to control the valve assembly, an annular skirt integral with the outer edge of the fulcrum plate, extending substantially parallel to the side walls of the housing, said fulcrum plate terminating beyond said deflector plate adjacent to the side walls whereby to provide support for the diaphragm when under pressure.

9. A servo motor according to claim 8, wherein two cylindrical cupped parts form said housing, radially outwardly directed flanges being provided on each cupped part and the outer peripheral edge of the diaphragm being clamped between said flanges.

10. A servo motor according to claim 9, wherein the diaphragm is cylindrical.

11. A servo motor according to claim 9, wherein radially extending circumferentially spaced fingers form the deflector plate.

12. A servo motor according to claim 11, wherein an output rod is connected to the fulcrum plate, the fulcrum plate being dished and provided with said annular bead.

13. A servo motor according to claim 8, wherein the fulcrum plate is of two part construction, one part forming a central portion and the other part in the form of an annular section, forming an extension of the fulcrum plate, the annular section being provided with said skirt along its outer edge and joined at its inner edge to the outer edge of said central portion.

14. A servo motor according to claim 13, wherein the annular section is made of thinner gauge metal than the central portion.

* * * * *